July 18, 1933.                    E. E. BRAGG                    1,918,684
                                 SULPHUR MELTER
                         Filed May 1, 1929        3 Sheets-Sheet 1

INVENTOR
Everett Eugene Bragg
BY
ATTORNEY

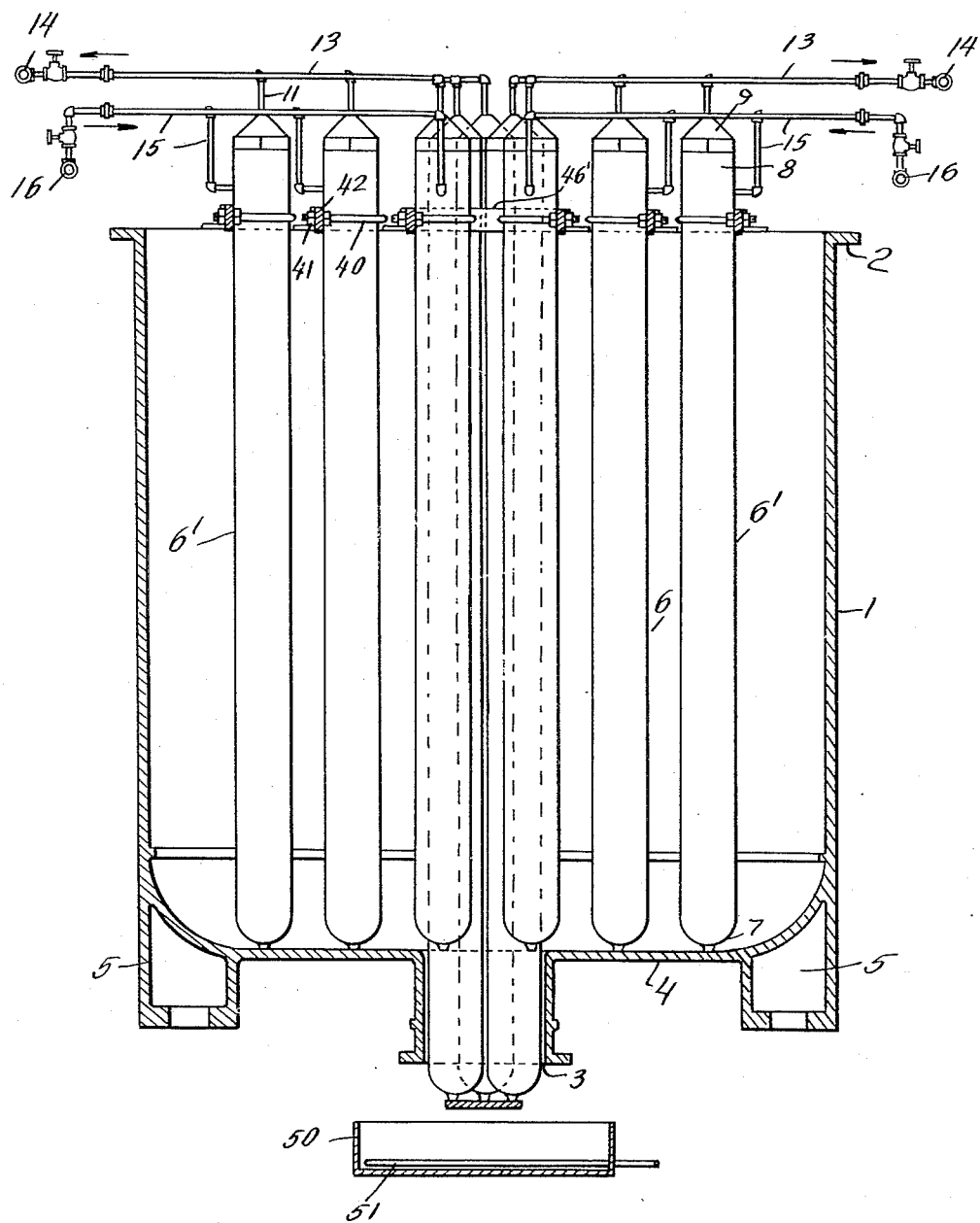

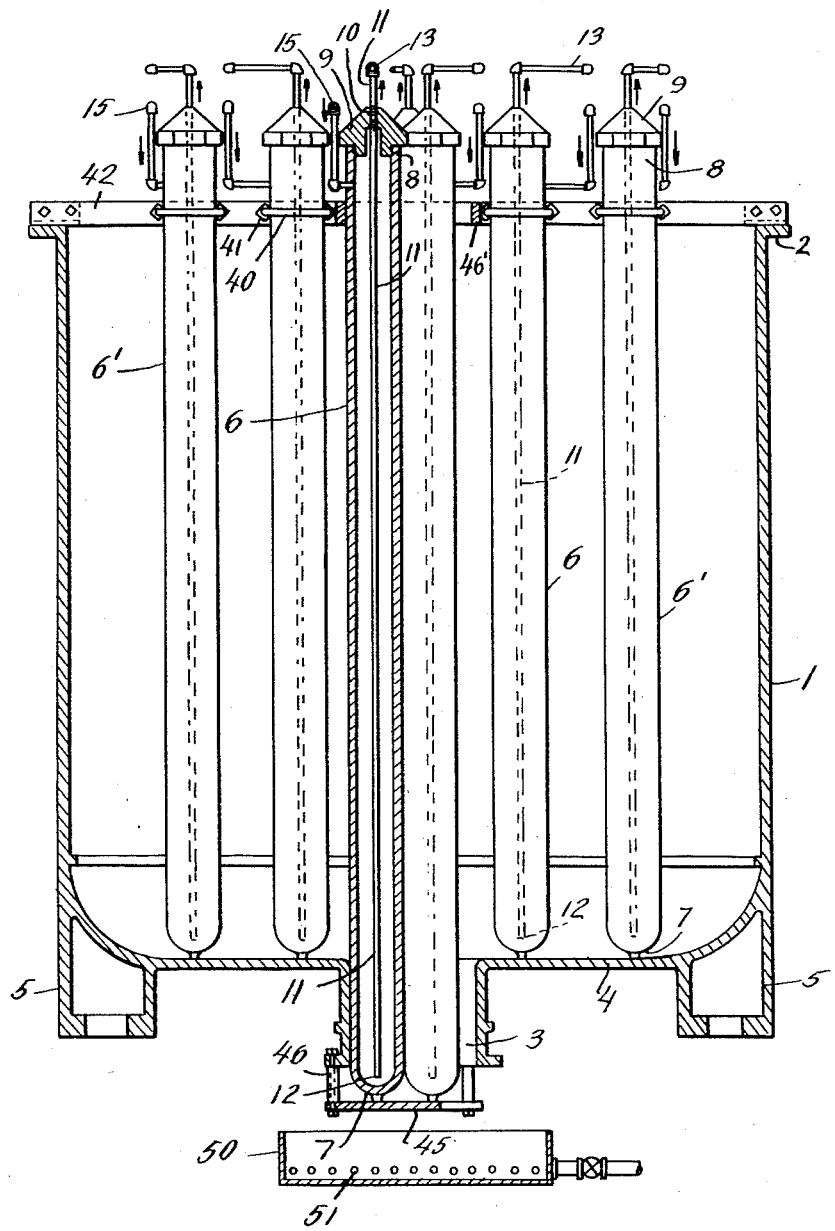

Patented July 18, 1933

1,918,684

UNITED STATES PATENT OFFICE

EVERETT EUGENE BRAGG, OF CHICAGO, ILLINOIS, ASSIGNOR TO GENERAL CHEMICAL COMPANY, OF NEW YORK, N. Y., A CORPORATION OF NEW YORK

SULPHUR MELTER

Application filed May 1, 1929. Serial No. 359,527.

This invention relates to sulphur melters such as are used for the melting of sulphur in the production of sulphuric acid.

Heretofore, sulphur has been melted by the passage of steam through steel coils placed within the pot or vessel in which the sulphur is melted. Such melters require frequent replacement of the steel coils, for in operation the coils become corroded and leaky within a relatively short period. I attribute this corrosion to the presence of weak sulphuric acid in the sulphur, since the corrosive action is particularly rapid when the sulphur charged into the melter contains moisture and the coils are not entirely immersed in the molten sulphur.

One object of this invention is to provide a melter not involving steel coils and which is of rugged construction, is not corroded or otherwise deleteriously affected in operation and which is adapted to continuously and efficiently melt the sulphur charged thereinto. Other objects and advantages of this invention will appear from the following description.

According to a preferred embodiment of this invention a sulphur melter is provided which comprises a vessel, preferably vertical, having therein a plurality of tubes disposed in parallel relation. Preferably, both the vessel and tubes are of cast iron but it will be understood that other metals or alloys not deleteriously affected by molten sulphur or sulphur containing moisture might be utilized. The tubes are arranged in rows which may run parallel to the side walls of the vessel or be disposed at an angle to the walls, the tubes being spaced from the walls of the vessel to permit the formation of an insulating layer of sulphur contiguous to the walls of the vessel. By spacing the outer rows of tubes adjacent the walls of the vessel approximately 8 inches therefrom, a layer of sulphur of about 6 inches forms contiguous to the walls, which layer functions as a protective coating for the walls and also as a heat insulating partition to concentrate the heat within the vessel. As is well known, sulphur is an excellent heat insulator.

I have discovered that for satisfactory and efficient operation the outer walls of the tubes should preferably be positioned so that the wall of one tube is spaced not more than about 3½ inches away from the walls of adjacent tubes. Preferably, the tubes are spaced in parallel rows, the outer walls of the tubes in one row being positioned 3 inches from the outer walls of the tubes in the next adjacent row. With the tubes spaced so that 5 inches or more separates adjacent tubes there remains a column or core of sulphur unmelted around each tube which insulates the tubes from each other and supports the sulphur charged into the melter, and largely due to the heat insulating properties of the sulphur very little sulphur is melted and leaves the discharge port of the melter. By placing the tubes as above described, i. e., so that not more than a 3½ inch space separates adjacent tubes, substantially complete melting of the sulphur between the tubes occurs and no column or core of sulphur is formed adjacent the tubes so that the fresh sulphur charged into the melter passes between the tubes and is thus continuously melted and discharged from the melter.

In accordance with this invention, each of the tubes is provided with a pipe extending therethrough to a point above the bottom of the tubes. The lower or bottom end of these pipes communicates with the interior of the tubes and the other or top end is connected to a header. Each of the tubes is also provided with a port which communicates with a header. Heating of the sulphur in the melter is accomplished by passing steam, or other heating fluid such as oil, at the desired melting temperature, through the tubes, the steam being continuously passed from the header through the tubes and discharged through the pipes into the return header. The temperature of the heating fluid used is of course high enough to accomplish the melting of the sulphur, i. e., it is above the melting point of sulphur and below temperatures which might cause ignition of the sulphur. Steam under approximately 55 pounds pressure is preferably utilized for dry sulphur and under 80 lbs. for wet sulphur.

It will be noted that this invention comprises a sulphur melter involving a vessel having a plurality of tubes therein, the tubes being equipped with heating fluid entry and discharge ports and being spaced from the walls of the vessel and grouped within the vessel so that they are sufficiently close to each other to efficiently melt the sulphur.

In the drawings forming a part of the specification—

Fig. 2 is a side view partly in section and partly in elevation of the melter; and Fig. 3 is a sectional view taken on the line 3—3 of Fig. 1.

Figure 1:
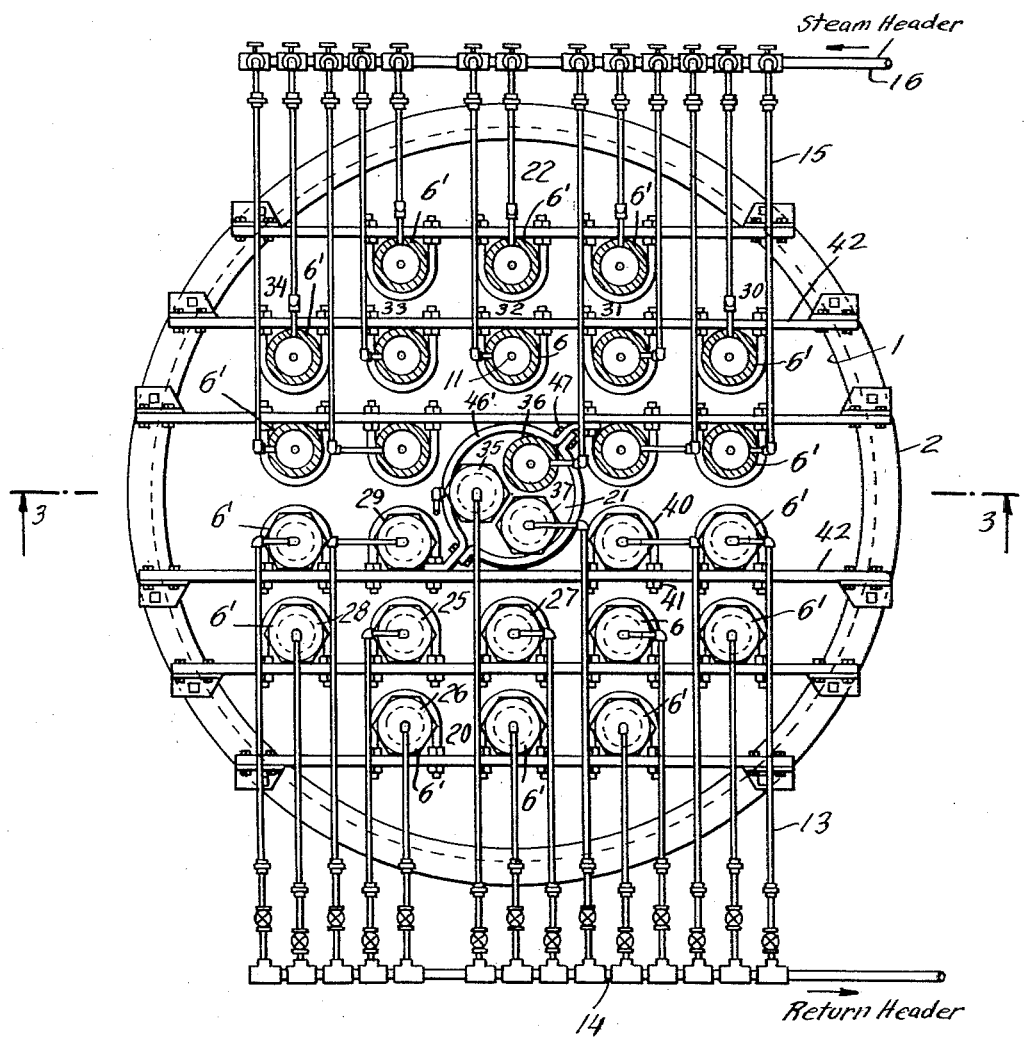
Fig. 1 shows a plan view, partly broken away, of a sulphur melter illustrating a preferred embodiment of this invention, one header and the connected pipes on each side of the figure being omitted for the sake of clearness.

Referring to the drawings, illustrating a preferred embodiment of this invention, 1 indicates a cast iron vessel or pot having an open flanged top 2 and a discharge port 3 in the base 4 thereof. The vessel 1 is suitably supported on legs 5, preferably cast integral with the vessel 1.

Positioned within the vessel extending through the open top are a plurality of cast iron tubes 6 of approximately 6 inches diameter, the lower ends 7 of which are closed and the upper ends 8 of which are interiorly threaded and arranged to receive closure caps 9, (Fig. 3). The caps 9 are provided with openings 10 extending therethrough arranged to receive and concentrically position pipes 11 with respect to the tubes 6. The lower ends 12 of pipes 11 extend to a point slightly above the bottom of the tubes 6 and are in open communication with the tubes. The upper ends of pipes 11 serve as discharge ports for the tubes 6, being connected by valved pipes 13 with a return header 14. Tubes 6 are each provided with entry ports communicating through valved pipes 15 with steam or other heating fluid headers 16. In the embodiment shown in Figs. 1 and 2, four headers are utilized, two return headers 14 and two steam or other heating fluid headers 16, as clearly shown in Fig. 2, the tubes on one side of a median line passing through the vessel being connected to one steam and one return header disposed parallel to that side of the vessel, and the tubes on the opposite side of said median line being connected to the pair of headers disposed outside and parallel to the opposite side of the vessel.

The tubes 6 are arranged in one or more groups, the outer tubes 6' of the group, i. e., the tubes contiguous to the inner walls of the vessel, being spaced approximately 8 inches from the walls of the vessel and each tube is spaced sufficiently close to adjacent tubes to efficiently melt the sulphur. In the embodiment of the invention shown in Fig. 1 the tubes are arranged in three groups, 20, 21 and 22. The outer tubes 6' of groups 20 and 22, as above indicated, are spaced approximately 8 inches from the inner wall of vessel 1. Each of the tubes 6 in groups 20 and 22 is spaced approximately 3 inches from each other, for example, tube 25 of group 20 is positioned approximately 3 inches from each of tubes 26, 27, 28 and 29. The tubes might of course be positioned closer than 3 inches to each other, but as closer positioning of the tubes would diminish the capacity of the vessel for sulphur and satisfactory melting of the sulphur occurs with the tubes spaced as described herein, the spacing of the tubes approximately 3 inches apart is preferred. The tubes of group 20, positioned opposite the corresponding tubes of group 22, are spaced 3 inches from these tubes. The arrangement of tubes may, therefore, be considered as consisting of one group involving five parallel rows, 30, 31, 32, 33 and 34, the tubes of one row being spaced approximately 3 inches from the tubes of an adjacent row and the tubes within rows 30, 31, 33 and 34 being spaced approximately 3 inches from each other.

The uniform arrangement of tubes in row 32 is interrupted to provide three tubes, 35, 36 and 37, which are of greater length than the other tubes and which extend through the discharge port 3. These three tubes function to maintain a temperature within the discharge port sufficiently high to prevent solidification of sulphur therein and thus prevents clogging of the discharge port 3. If desired, however, group 21 may be replaced by two tubes so that a uniform arrangement of tubes throughout the vessel is provided.

The tubes 6, 6' rest on the base 4 of vessel 1 and are secured in position by U-shaped straps or fastening members 40, the ends of which are fastened by nuts 41 to transverse bracing or supporting bars 42. The bars 42 are bolted or otherwise secured to the flanged top 2 of vessel 1.

A spider or supporting member 45 is secured by bolts 46 to the walls of the discharge port 3. This member acts as a support for the bottom ends of tubes 35, 36 and 37, and is formed as shown in Fig. 2 so as not to obstruct the discharge of the molten sulphur from the melter. The top ends of these three tubes are maintained in position by a circular clamping member 46' which engages the peripheries of the tubes and is clamped to the transverse bracing bars 42 by bolts 47. (Fig. 1). The discharge port 3 communicates with a pan or main 50 into and through which the molten sulphur passes from the melter. The pan 50 is provided with steam or other heating coils 51 for maintaining the sulphur passing therethrough in molten condition.

In operation steam or other heating fluid, such as oil, is forced from the steam headers 16 through pipes 15 into all the tubes, passing down through the tubes, the condensate (water, if steam is used) leaving through pipes 11, 13 through return headers 14. Preferably, steam under pressure of from 55 to 60 pounds is utilized as the heating medium.

Due to the spacing of the tubes 6' from the inner walls of the vessel a layer of sulphur of approximately 6 inches builds up contiguous to the walls, which layer protects the walls and also functions to concentrate the heat within the vessel. The arrangement of the tubes with respect to adjacent tubes prevents the formation of cores or plastic or semi-plastic solid sulphur masses between adjacent tubes. In other words, the sulphur as it passes between the tubes is melted and flows through discharge port 3. If desired solid sulphur, i. e., brimstone or the like, may be continuously charged into the top of the vessel and the melted sulphur continuously withdrawn through the discharge port.

While a preferred embodiment of the invention is shown and described herein, it will be understood that the invention is not limited thereto as various changes in the details thereof might be made by those skilled in the art.

I claim:

1. A sulphur melter comprising a vessel arranged to receive the sulphur to be melted and provided with a plurality of tubes within the vessel adapted to contain heating fluid at temperatures above the melting point of sulphur for imparting heat to melt the sulphur, said tubes being grouped within the vessel so that the outer wall of each of said tubes is spaced sufficiently close to adjacent tubes to melt the sulphur in said vessel.

2. A sulphur melter comprising a vertical vessel arranged to receive the sulphur to be melted and provided with a discharge port for the molten sulphur in the base thereof and a plurality of vertical tubes disposed in parallel relation within the vessel each provided with heating fluid entry and discharge ports, said tubes being adapted to contain heating fluid at temperatures above the melting point of sulphur, said tubes being grouped within the vessel so that the outer tubes of said group are spaced from the inner walls of said vessel and each tube is positioned sufficiently close to adjacent tubes to melt the sulphur intermediate the said tubes.

3. A sulphur melter comprising a vessel arranged to receive the sulphur to be melted and a plurality of tubes within the vessel adapted to contain heating fluid at temperatures above the melting point of sulphur for imparting heat to melt the sulphur, said tubes being grouped within the vessel so that each of said tubes is spaced approximately 3 inches from adjacent tubes.

4. A sulphur melter comprising a vessel having an open top and provided with a discharge port in the base thereof for the escape of molten sulphur and a plurality of tubes within the vessel provided with heating fluid entry ports, pipes within said tubes having one end open and spaced away from the bottom of said tubes, a header connected to the other end of said pipes, said tubes being adapted to contain heating fluid at temperatures above the melting point of sulphur, said tubes being grouped so that the outer tubes of said group are spaced away from the inner walls of said vessel a sufficient distance to permit an insulating layer of sulphur to form on said inner walls, and each tube of said group is positioned sufficiently close to adjacent tubes to melt the sulphur intermediate the said tubes.

5. A sulphur melter comprising a vertical vessel having an open top and provided with a discharge port in the base thereof for the molten sulphur, a plurality of vertical tubes within the vessel, pipes within said tubes having one end open and spaced away from the bottom of said tubes, said tubes being adapted to contain heating fluid at temperatures above the melting point of sulphur, said tubes being grouped so that the outer tubes of said group are spaced away from the inner walls of said vessel a sufficient distance to permit an insulating layer of sulphur to form on said inner walls, and each tube of said group is positioned sufficiently close to adjacent tubes to melt the sulphur and means for supplying heating fluid to said tubes and for withdrawing the heating fluid from said pipes.

6. A sulphur melter comprising a vessel open at the top and having a discharge port in the base thereof, tubes disposed in parallel relation within the vessel and arranged in rows, said tubes being adapted to contain heating fluid at temperatures above the melting point of sulphur, the outer walls of tubes in adjacent rows being spaced not more than about 3½ inches apart, pipes centrally positioned within the tubes, the bottom of the pipes being open and spaced away from the bottom of the tubes, a header connected to said tubes and a return header connected to the top of said pipes.

7. A sulphur melter comprising a vessel arranged to receive the sulphur to be melted and tubes positioned within the vessel for imparting heat to melt the sulphur, said tubes being spaced from the inner walls of said vessel to permit an insulating lining of sulphur to form thereon and being spaced sufficiently close to each other to avoid formation of cores of sulphur between the tubes.

8. A sulphur melter comprising a vertical vessel having an open top and provided with a discharge port in the base thereof for the molten sulphur, a plurality of vertical tubes within the vessel disposed parallel to the walls of said vessel, having one end extending to substantially the base of said vessel and the other end extending through said open top and pipes within said tubes having one end open and spaced away from the bottom of said tubes, said tubes being grouped so that the outer tubes of said group are spaced away from the inner walls of said vessel a sufficient distance to permit an insulating layer of sulphur to form on said inner walls and each tube of said group is positioned sufficiently close to adjacent tubes to melt the sulphur intermediate the said tubes, means for supplying steam to said tubes and for withdrawing the water from said pipes.

9. A sulphur melter comprising a cast iron vessel arranged to receive the sulphur to be melted and cast iron tubes positioned within the vessel for imparting heat to melt the sulphur, said tubes being grouped within the vessel so that the outer tubes of said group are spaced approximately 8 inches from the inner walls of said vessel and each of said tubes is spaced approximately 3 inches from the adjacent tubes.

10. A sulphur melter comprising a vessel arranged to receive sulphur to be melted and tubes positioned within the vessel for imparting heat to melt the sulphur, said tubes being spaced from the inner walls of the vessel and spaced from each other, the spacing arrangement being such that the distance between the adjacent tubes is less than that between the tubes and the inner walls of the vessel.

11. A sulphur melter comprising a vessel arranged to receive sulphur to be melted and tubes positioned within the vessel for imparting heat to melt the sulphur, said tubes being spaced from the inner walls of the vessel and spaced from each other, the spacing arrangement being such that the distance between the tubes and the inner walls of the vessel is in excess of twice the distance between adjacent tubes.

12. A sulphur melter comprising a vessel adapted to receive sulphur to be melted and tubes positioned within the vessel for imparting heat to melt the sulphur, said tubes being grouped within the vessel so that the outer tubes of said group are spaced approximately 8 inches from the inner walls of said vessel and each of said tubes is spaced approximately 3 inches from the adjacent tubes.

13. A sulphur melter comprising a vessel adapted to receive sulphur to be melted and provided with a discharge port for the molten sulphur and a plurality of tubes within the vessel having heating fluid entry and discharge ports, said tubes being grouped within the vessel so that the outer wall of each of said tubes is spaced sufficiently close to adjacent tubes to melt the sulphur intermediate the said tubes, and at least one of said tubes extending into the sulphur discharge port to maintain the temperature within the discharge port sufficiently high to prevent solidification of the sulphur therein.

14. A sulphur melter comprising a vessel adapted to receive sulphur to be melted and provided with a discharge port for the molten sulphur, sulphur heating means in said vessel adapted to be heated to temperatures above the melting point of sulphur to melt the sulphur adjacent said means, said means being spaced from the inner walls of the vessel sufficiently to permit the formation of an insulating layer of sulphur on said inner walls, and heating means extending into the sulphur discharge port to maintain the temperature within the discharge port sufficiently high to prevent solidification of the sulphur therein.

EVERETT EUGENE BRAGG.

CERTIFICATE OF CORRECTION.

Patent No. 1,918,684.  July 18, 1933.

EVERETT EUGENE BRAGG.

It is hereby certified that error appears in the printed specification of the above numbered patent requiring correction as follows: Page 3, line 40, claim 1, for "in said vessel" read "intermediate the said tubes"; and that the said Letters Patent should be read with this correction therein that the same may conform to the record of the case in the Patent Office.

Signed and sealed this 29th day of August, A. D. 1933.

M. J. Moore.

(Seal)  Acting Commissioner of Patents.